Figure 1:
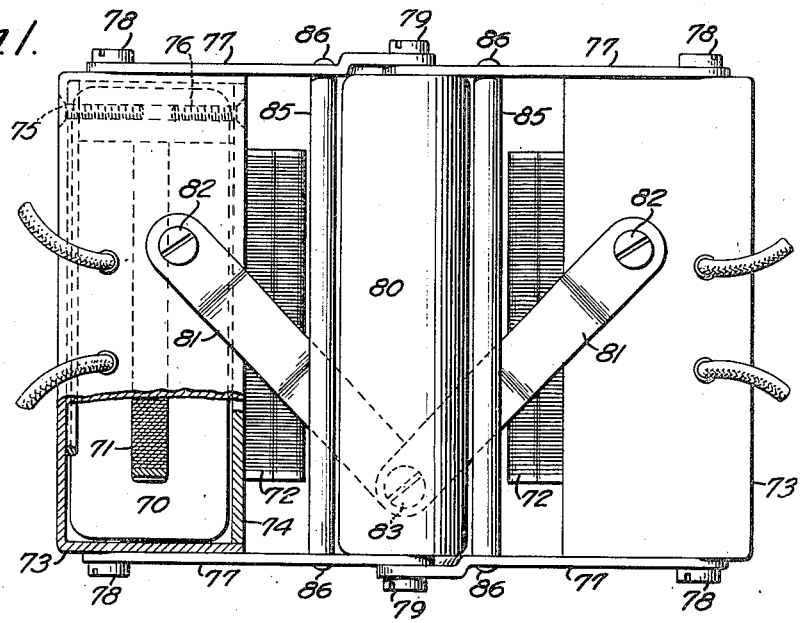

Jan. 20, 1925.  
O. O. CECCARINI  
METHOD OF AND APPARATUS FOR LOCATING FAULTS  
Filed Nov. 20, 1922  2 Sheets—Sheet 1

1,523,398

Inventor:
Olindo O. Ceccarini
by ____ Attÿ

Jan. 20, 1925.  
O. O. CECCARINI  
1,523,398  
METHOD OF AND APPARATUS FOR LOCATING FAULTS  
Filed Nov. 20, 1922  2 Sheets-Sheet 2
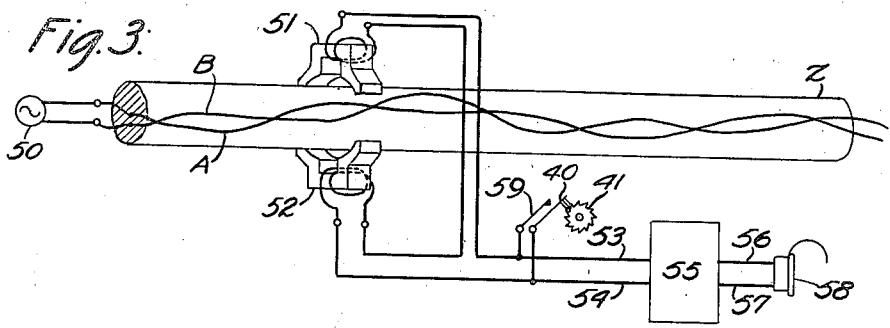
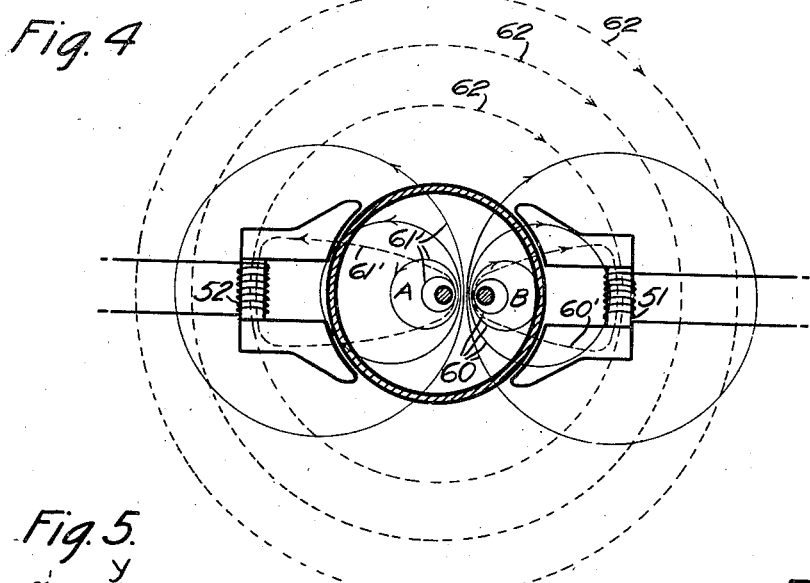
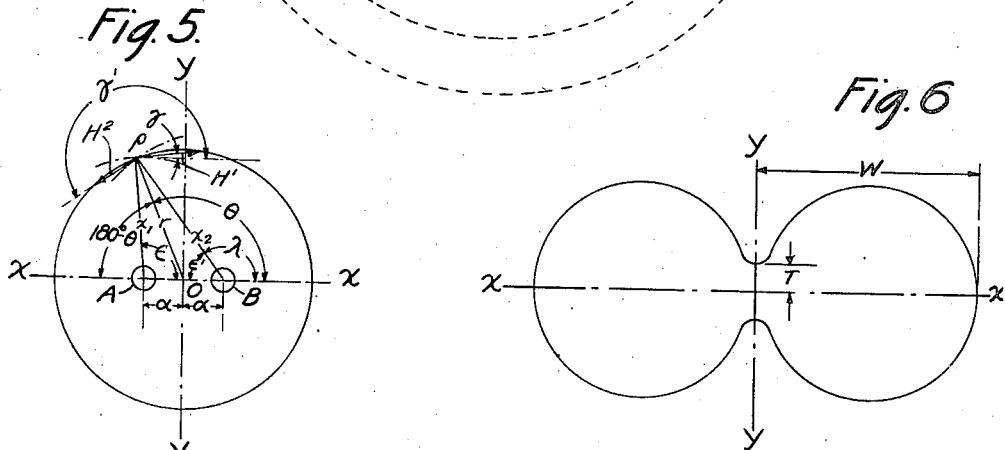
Inventor:  
Olindo O. Ceccarini  
by Joel W. Palmer, Atty.

Patented Jan. 20, 1925.

1,523,398

UNITED STATES PATENT OFFICE.

OLINDO O. CECCARINI, OF MAHWAH, NEW JERSEY, ASSIGNOR TO WESTERN ELECTRIC COMPANY INCORPORATED, OF NEW YORK, N. Y., A CORPORATION OF NEW YORK.

METHOD OF AND APPARATUS FOR LOCATING FAULTS.

Application filed November 20, 1922. Serial No. 602,022.

*To all whom it may concern:*

Be it known that I, OLINDO O. CECCARINI, a subject of the King of Italy, residing at Mahwah, in the county of Bergen, State of New Jersey, have invented certain new and useful Improvements in Methods of and Apparatus for Locating Faults, of which the following is a full, clear, concise, and exact description.

This invention relates to fault locating systems and particularly to a method and apparatus for locating faults between two conductors of a telephone cable. The invention is particularly applicable to the location of high resistance faults between the two conductors of a single pair in a cable, but is not limited to this application.

The objects of the invention are, in general, to provide an efficient method for locating faults between two conductors in a cable, and to provide a convenient apparatus for carrying out the method of this invention.

In order to locate a fault between two conductors of a cable, it is common practice to connect the two conductors to a source of audible frequency current and to explore the cable by means of an exploring coil connected to a telephone receiver. The current passes along one of the conductors until the fault is reached, when it passes to the other conductor and back to the source again. The exploring coil is passed along the cable and when the point is reached at which no sound is heard in the telephone receiver it is known that the fault has been reached. It has been generally known that two wires carrying currents in opposite directions set up a magnetic field which has its greatest intensity at a point between the two conductors and that at that point the direction of the field is in a plane perpendicular to the plane of the two conductors. For this reason, in locating faults between two wires in a cable, cables have been explored by placing an exploring coil or coils so that the axis of the coil is perpendicular to the plane of the conductors at a point between the conductors.

If the resistance of the fault is high it is apparent that only a very small amount of current can be caused to pass through it; and since the flux set up by this current is very weak, it has been found in such cases that exploring coils used as explained in the preceding paragraph do not pick up sufficient flux to cause an audible sound to be produced by the receiver.

The method of this invention is based upon the discovery that when two current carrying wires are located so that an exploring coil cannot be placed close to them, as is usually the case when the wires are part of a cable, much more flux can be picked up by placing the exploring coil in a position which is believed to be quite different from that previously used.

In accordance with this discovery, a test for a fault between two wires in a cable is made by applying two exploring coils to opposite sides of the cable sheath, and placing them in a position so that their axes are parallel to each other and the coils are perpendicular to and bisected by the plane of the conductors at that point in the cable. The two coils are connected in series aiding with respect to the E. M. F.'s induced by the flux set up by the current in the two conductors. This results in a stronger detecting current being supplied to the receiver and the exploring coil circuit being rendered neutral to flux, set up by any current which may be flowing in the cable sheath.

Figure 2:
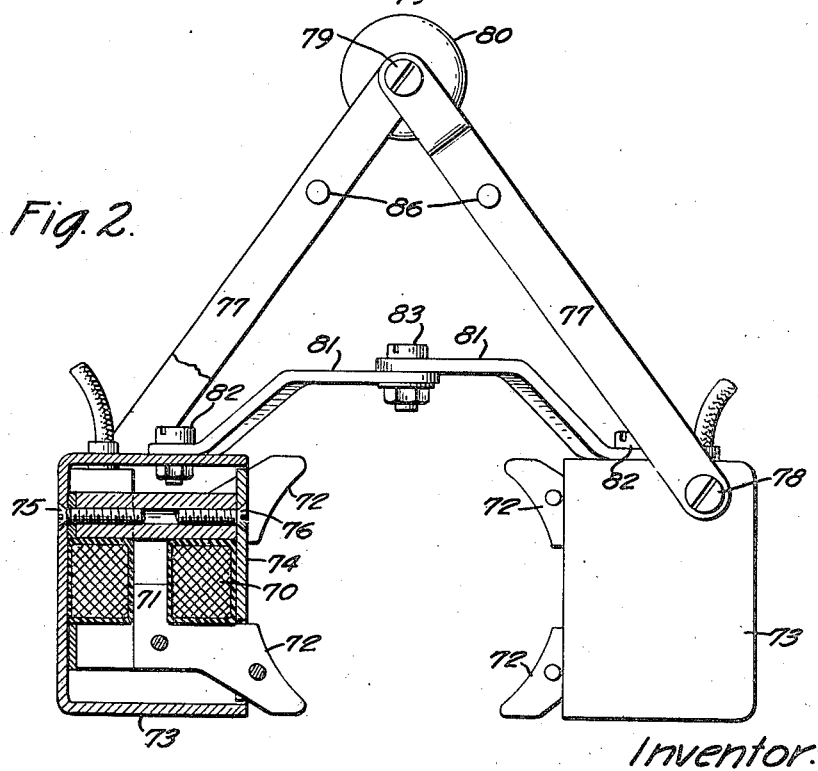

Referring to the drawings:

Fig. 1 is a plan view showing the mechanical construction of the exploring coil of this invention; Fig. 2 is a side elevation, partially in cross section, showing the mechanical construction of the exploring coil; Fig. 3 is a schematic diagram showing the exploring coil applied to a cable, and the apparatus employed in making a test; Fig. 4 is a schematic diagram showing a pair of coils applied to a cable sheath, and the magnetic field set up by currents flowing in a pair of conductors within the sheath, and the field set up by current flowing in the sheath; Fig. 5 is a geometric diagram showing a cable sheath and two conductors symmetrical with respect to the centre of the sheath; Fig. 6 is a polar curve showing the intensity of the magnetic field at the periphery of the cable sheath, due to current flowing in two conductors within the sheath which are symmetrical with respect to the centre of the sheath.

The following mathematical consideration in conjunction with Figs. 5 and 6 will show the advantage of applying a pair of coils to the cable sheath as shown in Figs. 3 and 4: Let:

O be the center between the two conductors r be the radius of the cable sheath with center at O $X_1$ be the line joining the centre of conductor A to any point P on the outer periphery of the sheath.

$X_2$ be the line joining the centre of conductor B to the same point P.

$\theta$ be the positive angle formed by the radius r with the horizontal axis $\varepsilon$ be the positive angle formed by $X_1$ and the horizontal axis.

$\lambda$ be the positive angle formed by $X_2$ and the horizontal axis and $\varepsilon'$ be the supplementary angle of $\lambda$ $\alpha$ be the distance from the center O to each conductor.

Since the figure is symmetrical with respect to the X—X axis, it will be sufficient to determine the magnetic potential gradient for the upper half of the cable section. (The lower half being the same).

It is well known that if $H^1$ is the intensity of the magnetic field set up at a point P by current in a conductor A which is at a distance $X_1$ from P $$H^1 = \frac{\mu I}{2\pi X_1}$$

Since there is no magnetic material in the cable the intensity per unit current becomes $$H^1 = \frac{1}{2\pi X_1}$$

Similarly, if $H^2$ is the intensity at P due to unit current flowing in conductor B $$H^2 = \frac{1}{2\Pi X_2}$$

Now $X_1 = (\alpha^2 + r^2 + 2\alpha r \cos \theta)^{\frac{1}{2}}$ (by trigonometry)

$$\therefore H^1 = \frac{1}{2\Pi(\alpha^2 + r^2 + 2\alpha r \cos \theta)^{\frac{1}{2}}}$$

$H^1$ is a vector tangential at P to a circle of radius $X_1$ and concentric with A. $\gamma$ is the positive angle between $H^1$ and the X-axis.

$$X_2 = (r^2 + \alpha^2 - 2\alpha r \cos \theta)^{\frac{1}{2}}$$

$$\therefore H^2 = \frac{1}{2\Pi(r^2 + \alpha^2 - 2\alpha r \cos \theta)^{\frac{1}{2}}}$$

$H^2$ is a vector tangential at P to a circle of radius $X_2$ and concentric with B. $\gamma'$ is the positive angle between $H^2$ and the X-axis. The resultant field intensity $H_0$ at point P is the vector sum of $H^1$ and $H^2$.

$$H_0 = \{H^{1\,2} + H^{2\,2} + 2H^1 H^2 \cos(\gamma' - \gamma)\}^{\frac{1}{2}}$$

$$= \frac{1}{2\Pi}\left(\frac{1}{\alpha^2 + r^2 + 2\alpha r \cos \theta} + \frac{1}{\alpha^2 + r^2 - 2\alpha r \cos \theta} + \frac{2 \cos(\gamma' - \gamma)}{\{(\alpha^2 + r^2 + 2\alpha r \cos \theta)(\alpha^2 + r^2 - 2\alpha r \cos \theta)\}^{\frac{1}{2}}}\right)^{\frac{1}{2}}$$

By geometry $\gamma' - \gamma = -(\varepsilon' + \varepsilon)$ $$\therefore H_0 = \frac{1}{2\Pi}\left(\frac{1}{\alpha^2 + r^2 + 2\alpha r \cos \theta} + \frac{1}{\alpha^2 + r^2 - 2\alpha r \cos \theta} + \frac{2 \cos(\varepsilon' + \varepsilon)}{\{(\alpha^2 + r^2 + 2\alpha r \cos \theta)(\alpha^2 + r^2 - 2\alpha r \cos \theta)\}^{\frac{1}{2}}}\right)^{\frac{1}{2}}$$

By means of the above equation for $H_0$ the polar curve may be plotted showing the field intensity at the periphery of the cable sheath due to the current flowing in two conductors within the sheath which are symmetrical with respect to the centre of the sheath. Fig. 6 is an example of a polar curve plotted from this equation and shows the field intensity for the case where the conductors lie upon the X—X axis.

It is seen from this curve that an exploring coil applied to the cable so that its axis is perpendicular to the plane of the two conductors being tested, at a point midway between the conductors, will only pick up an amount of flux proportional to distance T on Fig. 6, whereas under the same condition an exploring coil applied to the cable as shown in Fig. 4 will pick up an amount of flux proportional to distance W; and a two part exploring coil connected as shown in Fig. 3 will energize the exploring coil circuit with an E. M. F. proportional to $2^W$, whereas under the same conditions a two part exploring coil placed as explained at the beginning of this paragraph will energize the exploring coil circuit with an E. M. F. proportional to $2^T$.

Suppose there is a fault at Z (Figure 3) between conductors A and B which is desired to locate. A source of varying current 50 is connected to the two conductors and the two parts of the exploring coil comprising windings 51 and 52 are applied to the cable shown. Due to the flux set up by the current flowing in conductors A and B, a current will be delivered over wires 53 and 54 to amplifier 55, which may be of any well known and suitable construction. After being amplified by amplifier 55, the current will pass over conductors 56 and 57 and energize receiver 58. In order to reduce the capacity reactance between conductors A and B, it is usually found desirable to have source 50 supply a current of very low frequency, e. g. 15 or 20 cycles. A current of such low frequency will not cause receiver 58 to produce an audible sound and therefore a make-and-break comprising contacts 59 and 40 actuated by any suitable mechanism, such as 41, may be provided to rapidly and periodically short-circuit the exploring coil. In this way, audible frequency current will be supplied to amplifier 55 and an audible signal will be produced by receiver 58 corresponding to the current of inaudible frequency in wires A and B. The exploring coil is passed along the cable and as soon as point Z is passed, there is a marked change in the intensity of the tone in receiver 58 and the location of the fault is known.

It is seen from Fig. 4 that current in conductors A and B sets up lines of magnetic field intensity (not flux) which are represented by 60 and 61. If the two parts of the exploring coil are applied to the cable sheet as shown in this figure, the magnetic field intensity represented by lines 60 and 61 results in flux along the path of lines 60' and 61' passing through the windings of the exploring coil. Any current which is flowing in the cable sheath will set up lines of magnetic field intensity represented by 62, and the flux due to this field intensity will follow the same path. It is seen that if windings 51 and 52 are connected in series, as shown in Fig. 3, the E. M. F. induced in windings 51 and 52 by fluxes 60' and 61' respectively, will be cumulative; whereas E. M. F. induced in coil 52 by the flux corresponding to the lines of field intensity 62, will be neutralized by an equal and opposite E. M. F. induced in coil 51.

In the calculations made in conjunction with Figs. 5 and 6 it was assumed that conductors A and B were symmetrically positioned with respect to the center of the cable sheath. If instead of lying in such a position they are positioned as shown in Fig. 4, flux 60' will be stronger than 61' and therefore a larger E. M. F. will be induced in winding 51 than is induced in windings 52. However, these two electromotive forces are cumulative and the net result for the entire exploring coil circuit is substantially the same as if the cable conductors were positioned as shown in Fig. 5. The twist of a cable is not such that the conductors of a pair always lie on a diameter as shown in Fig. 4, but the twist is such that the conductors in every pair periodically lie on a diameter of the cable sheath, and hence, no matter what pair of the cable is being tested, it will always be possible to position the two parts of the exploring coil with reference to the conductors of the pair as shown in Fig. 4.

In Figs. 1 and 2 is shown a convenient mechanical arrangement which holds the two sections of the exploring coil so that their axes are always parallel; and at the same time permitting the two parts of the coil to be readily applied to cable sheaths of various diameters. The solenoidal windings 70 are provided with magnetic cores 71 having projections 72 which are adapted to cooperate with the surface of a cable sheath. The windings are enclosed in a non-magnetic casing comprised of sections 73 and 74, which are secured in place by means of screws 75 and 76. The two casings enclosing the solenoidal windings are secured together by means of two pairs of members 77, which are pivoted to the casing enclosing the windings at 78 and are pivotally secured together by means of screws 79 which are screwed into the ends of a wooden handle 80. An additional pair of members 81, is pivoted to the casings at 82 and the two members are pivotally secured together at 83, thus insuring that the axis of the solenoidal windings 70, will be maintained parallel as the windings are moved together or apart. In order to make a strong construction, rods 85 may be positioned as shown between the pairs of members 77. These rods may be rigidly fastened to members 77 by any suitable means such as riveting at 86.

An exploring coil circuit similar to that shown in Figure 3, has been previously used to locate faults between a single conductor and a cable sheath as is shown in patent to Pennel et al., 925,594, June 22, 1909. However, this patent contains no suggestions which are helpful in solving the problem of the location of faults between two conductors within a cable sheath.

The invention claimed is:

1. A method of locating a fault between two conductors of an electric cable which comprises causing a varying current to flow through said conductors and through the fault, and detecting said current by means of a circuit comprising an exploring coil placed adjacent the cable sheath so that the coil is substantially bisected by and is perpendicular to the plane of the two conductors.

2. A method of locating a fault between two conductors of an electric cable which comprises causing a varying current to flow through said conductors and through the fault, detecting said current by a circuit comprising two exploring windings placed on opposite sides of the cable so that each of the windings is substantially bisected by and is perpendicular to the plane of the two conductors.

3. A method of locating a fault between two conductors of an electric cable which comprises causing a varying current to flow through said conductors and through the fault, detecting said current by a circuit comprising an exploring coil placed adjacent to the cable sheath so that the coil is substantially bisected by and is perpendicular to the plane of the two conductors, and neutralizing said circuit with respect to current flowing in the cable sheath.

4. A method of locating a fault between two conductors of an electric cable which comprises causing a varying current to flow through said conductors and through the fault, detecting said current by a circuit comprising two exploring windings placed on opposite sides of the cable sheath so that the windings are substantially bisected by and are perpendicular to the plane of the two conductors, and neutralizing said circuits with respect to current flowing in the cable sheath.

5. An exploring coil for electric cables comprising two solenoidal windings, one movable relative to the other, and means for maintaining the axis of said windings substantially parallel.

6. An exploring coil for electric cables comprising two solenoidal windings provided with cores of magnetic material, said windings being movable relative to each other, and means for maintaining the axis of said windings substantially parallel.

7. An exploring coil for electric cables comprising two solenoidal windings provided with cores of magnetic material having projections for cooperating with the surface of a cable sheath, said windings being movable relative to each other, and means for maintaining the axis of said windings substantially parallel.

8. An exploring coil for electric cables comprising two solenoidal windings, the relative position of said windings being controlled by a pair of members which are pivoted together and pivoted to points rigidly associated with said windings and by a second pair of members which are pivoted together and pivoted to points rigidly associated with said windings, the pivots of said second pair of members being in a plane substantially perpendicular to the homologous pivots of said first pair of members.

In witness whereof, I hereunto subscribe my name this 14th day of November, A. D., 1922.

OLINDO O. CECCARINI.